United States Patent
Ulrich et al.

(10) Patent No.: US 9,243,532 B2
(45) Date of Patent: Jan. 26, 2016

(54) PUMPING DEVICE FOR SUPPLYING AN EXHAUST GAS AFTERTREATMENT SYSTEM OF AN INTERNAL COMBUSTION ENGINE WITH A REDUCTANT, AND METHOD

(75) Inventors: Markus Ulrich, Rudersberg (DE); Christoph Waletzek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 129 days.

(21) Appl. No.: 13/978,421

(22) PCT Filed: Dec. 27, 2011

(86) PCT No.: PCT/EP2011/074062
§ 371 (c)(1),
(2), (4) Date: Jul. 5, 2013

(87) PCT Pub. No.: WO2012/093051
PCT Pub. Date: Jul. 12, 2012

(65) Prior Publication Data
US 2013/0276430 A1    Oct. 24, 2013

(30) Foreign Application Priority Data

Jan. 4, 2011    (DE) .......................... 10 2011 002 425

(51) Int. Cl.
*F01N 3/00*    (2006.01)
*F01N 3/08*    (2006.01)
(Continued)

(52) U.S. Cl.
CPC .............. *F01N 3/08* (2013.01); *F01N 3/2066* (2013.01); *F04B 17/03* (2013.01); *F04B 23/04* (2013.01);
(Continued)

(58) Field of Classification Search
CPC ..... F01N 3/08; F01N 3/2066; F01N 2610/14; F01N 2610/1433; F01N 2610/1473; F04B 17/03; F04B 23/04; Y02T 10/24
USPC .............. 60/272–324; 239/410, 411, 533.13; 137/565.31, 107; 417/350, 563, 565, 417/565.35, 286
See application file for complete search history.

(56) References Cited

U.S. PATENT DOCUMENTS 2,775,204 A * 12/1956 Batten et al. ................... 417/319
3,128,782 A *  4/1964 Limpert et al. .................. 137/1
(Continued)

FOREIGN PATENT DOCUMENTS

| CN | 101646845 | 2/2010 |
|---|---|---|
| DE | 19704248 | 8/1998 |
| DE | 102008000932 | 10/2009 |
| JP | 2005240811 | 9/2005 |
| WO | 2004107534 | 12/2004 |

OTHER PUBLICATIONS

International Search Report for Application No. PCT/EP2011/074062 dated Apr. 19, 2012 (2 pages).

*Primary Examiner* — Jesse Bogue
*Assistant Examiner* — Kelsey Stanek
(74) *Attorney, Agent, or Firm* — Michael Best & Friedrich LLP

(57) ABSTRACT

The invention relates to a pumping device (20) for supplying an exhaust gas aftertreament system (10) of an internal combustion engine with a reductant (14), in particular with a urea-water solution, in order to reduce nitrogen oxides (NOx) in the exhaust gas flow of the internal combustion engine, comprising a motor (32) for driving two pumps (22, 24). According to the invention, the first pump (22) is connected to the motor (32) by means of a first coupling, and the second pump (24) is connected to the motor by means of a second coupling. In a preferred embodiment, the couplings are designed as freewheel couplings (26, 28) acting in opposite directions, so that a switch between a "pumping state" and a "suck-back state" can be made by simply reversing the direction of rotation of the motor (32).

18 Claims, 4 Drawing Sheets

(51) Int. Cl.
  *F01N 3/20* (2006.01)
  *F04B 17/03* (2006.01)
  *F04B 23/04* (2006.01)

(52) U.S. Cl.
  CPC ..... *F01N 2610/14* (2013.01); *F01N 2610/1433* (2013.01); *F01N 2610/1473* (2013.01); *Y02T 10/24* (2013.01)

(56) References Cited

U.S. PATENT DOCUMENTS

| | | | | |
|---|---|---|---|---|
| 6,361,287 | B1* | 3/2002 | Hopper | 417/286 |
| 2010/0043409 | A1* | 2/2010 | Naydenov et al. | 60/287 |
| 2010/0115928 | A1 | 5/2010 | Asaura et al. | |
| 2010/0322791 | A1* | 12/2010 | Wadsley et al. | 417/286 |
| 2011/0000196 | A1* | 1/2011 | Kasahara | 60/286 |

\* cited by examiner

PUMPING DEVICE FOR SUPPLYING AN EXHAUST GAS AFTERTREATMENT SYSTEM OF AN INTERNAL COMBUSTION ENGINE WITH A REDUCTANT, AND METHOD

BACKGROUND OF THE INVENTION

In the case of motor vehicles with internal combustion engines, ever stricter exhaust emissions limits mean that air pollutants, such as nitrogen oxides (NOx), in the exhaust gas flow must be reduced to a greater and greater extent. One known method which is used in this context is catalytic reduction (known as "Selective Catalytic Reduction" or SCR). In this case, a reductant is pumped out of a tank as far as a metering module in the region of the exhaust line by means of a pump. The metering module required to inject the reductant is arranged within the exhaust line, generally ahead of the catalyst in which the reduction of nitrogen oxides takes place. A 32.5% aqueous urea solution (known as "AdBlue®") is generally used as a reductant. In many cases, diaphragm pumps are used to deliver the reductant, and these generally have a preferred direction of delivery.

In many cases, the diaphragm pumps are driven by means of an electric motor having an eccentric connected by a connecting rod to the pump diaphragm. If the eccentric is set in rotation with the aid of the electric motor, the pump diaphragm is periodically raised and lowered by the connecting rod, with the result that the reductant is drawn in from the storage tank and pumped as far as the metering module. An orifice or restrictor arranged downstream of the diaphragm pump prevents a pressure rise in the system when the metering module is closed or is delivering only a very small quantity of the reductant into the exhaust line. For this purpose, the delivered quantity that is not required is directed back into the storage tank by the orifice via an additional return line. The exhaust gas aftertreatment system furthermore has a complex open-loop and/or closed-loop control device for controlling all the system processes and a large number of sensors and actuators, which are interconnected via a bidirectional bus system.

The aqueous urea solution freezes below −11° C. In order to ensure the required ice pressure resistance after the internal combustion engine is switched off, the reductant must as far as possible be sucked back completely out of all regions which are exposed over a prolonged period to a temperature of −11° C. or less. In order to be able to implement the suck-back process by means of the diaphragm pumps which are conventionally employed, a separate 4/2-way valve is generally used.

In normal delivery mode, in particular during the normal operation of the internal combustion engine, the 4/2-way valve is in the deenergized idle state, allowing the reductant to be pumped out of the tank with the aid of the diaphragm pump and reach the metering module via the 4/2-way valve. While the reductant is being sucked back out of the exhaust gas aftertreatment system, the delivery direction of the diaphragm pump can be maintained unaltered. Only the 4/2-way valve is activated. In normal delivery mode, the reductant flows in opposite directions through two parallel ducts in the 4/2-way valve while, in suck-back mode, the reductant flows in opposite directions through two further, intersecting ducts in the 4/2-way valve.

However, multi-way valves of this kind involve a construction of complex design and are therefore also expensive to produce. Moreover, such valves are prone to leaks, are susceptible to wear and require a lot of maintenance.

SUMMARY OF THE INVENTION

It is therefore the object of the invention to provide a pumping device for exhaust gas aftertreatment systems, in particular those operating by the "SCR" method, which has little tendency to wear, has a high degree of fail safety and furthermore requires little maintenance.

A pumping device for supplying an exhaust gas aftertreatment system of an internal combustion engine with a reductant, in particular with an aqueous urea solution, in order to reduce nitrogen oxides in the exhaust gas flow of the internal combustion engine is disclosed, having a motor for driving two pumps.

According to the invention, the first pump is connected to the motor by means of a first coupling, and the second pump is connected to the motor by means of a second coupling.

The couplings are preferably designed as freewheel couplings but, as an alternative, can also be embodied as switchable (releasable) couplings. It is thereby possible in a simple way selectively to connect the first pump (suck-back pump) or the second pump (delivery pump) to the drive motor and thus to switch from what is referred to as a normal "delivery state" while the internal combustion engine is running to what is known as a "suck-back state", in particular after a relatively long stoppage time of the internal combustion engine. The required ice pressure resistance at ambient temperatures of −11° C. or below is achieved by means of the, ideally complete, sucking back of the reductant out of the exhaust gas aftertreatment system in order to prepare for a relatively long stoppage time of the internal combustion engine.

In the preferred embodiment of the pumping device, the couplings are freewheel couplings acting in opposite directions.

It is thereby possible to switch from the "delivery state" to the "suck-back state" and vice versa by simply reversing the direction of rotation of the motor. When the motor is stationary, neither of the two pumps is driven—irrespective of the switching state of the couplings—and therefore the pumping device is in what is known as the "idle state". Each of the pumps connected for operation in opposite directions is therefore only ever operated in the delivery direction thereof, irrespective of the system state ("delivery state"/"suck-back state").

Another advantageous embodiment of the pumping device envisages that a metering module of the exhaust gas aftertreatment system is connected to a discharge line of the second pump and to a suction line of the first pump by means of a shuttle valve. The metering module is used to inject a precisely determined quantity of the reductant into an exhaust pipe containing a catalyst for reducing the nitrogen oxides. It is in the catalyst that the actual selective chemical reduction of nitrogen oxides in the exhaust gas flow of the internal combustion engine to water ($H_2O$) and nitrogen ($N_2$) takes place. The shuttle valve allows an effective hydraulic separation between the two pumps, with the shuttle valve being switched over automatically simply by the pressure conditions prevailing at a pressure port and a suction port of the shuttle valve. The filter unit and the metering module arranged downstream thereof are connected to the shuttle valve via a third port of the shuttle valve, through which the reductant flows in both directions (bidirectional port).

In a preferred embodiment, a suction line of the second pump and a discharge line of the first pump are connected to a storage tank for the reductant.

Owing to this arrangement of the lines, the reductant can be drawn in from the storage tank by means of the second pump during the normal operation of the internal combustion engine and pumped onward at excess pressure as far as the metering module via the shuttle valve. In addition, this line routing enables the reductant to be sucked back out of the metering module via the shuttle valve as far as the storage tank by means of the first pump in order to initiate a relatively long stoppage time of the internal combustion engine.

Another advantageous embodiment of the pumping device envisages that both pumps are designed as diaphragm pumps.

The diaphragm pumps make possible a pumping device construction of simple design. Moreover, diaphragm pumps have good corrosion resistance since the pumping space is separated completely from the drive zone by the diaphragm. The use of diaphragm pumps increases the operational reliability of the pumping device for the reductant, which is generally chemically aggressive, and, at the same time, considerably reduces the outlay on maintenance. In general, diaphragm pumps allow virtually maintenance-free operation for the entire life of a motor vehicle.

According to another advantageous embodiment, it is envisaged that an electric motor, in particular an external rotor motor, is used to drive the pumps.

First of all, the embodiment of the motor as an electric motor has the advantage of ease of closed-loop and/or open-loop control. Moreover, the use of an external rotor motor has the advantage that the delivery flow can be made more uniform through the high moment of inertia of the rotor rotating around the stator.

According to another advantageous development of the pumping device, at least one return flow restrictor is provided.

Particularly where use is made of an external rotor motor, the rotating rotor of which generally has a high moment of inertia, the motor remains continuously switched on in the "delivery state" in order to ensure as a uniform a delivery flow is possible and to minimize the run-up times of the motor. Moreover, a motor which is permanently switched on allows a uniform delivery flow, thereby ensuring a reliable and continuous supply of the reductant to the metering module. However, continuous operation of the motor and of the associated second pump in the "delivery state" can lead to an unwanted pressure increase in the region of the discharge line between the second pump, the shuttle valve and the metering module if too little or no reductant is discharged by the metering module. In order to avoid such a pressure rise, a return flow restrictor or a return flow orifice can preferably be provided in the discharge line between the second pump and the shuttle valve, directing the excess reductant that is not required by the metering module back to the storage tank via an additional return flow line.

In an alternative embodiment, the return flow restrictor can be an integral part of the shuttle valve. In general, a restrictor or an orifice with a cylindrical bore and a small cross-sectional area is implemented technically.

In addition, a method, in particular for operating a pumping device of this kind, for supplying an exhaust gas aftertreatment system of an internal combustion engine with a reductant, in particular with an aqueous urea solution, in order to reduce nitrogen oxides in the exhaust gas flow of the internal combustion engine, is disclosed, having a motor for driving two pumps.

According to the method, a switch is made between a "delivery state" and a "suck-back state" by reversing the direction of rotation of the motor, wherein, in the delivery state, the reductant is pumped out of a storage tank for the reductant, via a shuttle valve, as far as a metering module by means of the second pump and, in the "suck-back state", the reductant is sucked back out of the metering module, via the shuttle valve, into the storage tank by means of the first pump.

Simply by changing the direction of rotation of the motor, the method allows a quick change between the "delivery state", in which the metering module of the exhaust gas aftertreatment system is supplied with the reductant, and the "suck-back state", in which the reductant contained in the exhaust gas aftertreatment system is returned almost completely to the storage tank in order to achieve the required ice pressure resistance in the case of relatively long stoppage times. After the motor has been switched off, the system is in an "idle state", in which there is no delivery of the reductant.

BRIEF DESCRIPTION OF THE DRAWINGS

The invention will be described in greater detail below by means of the drawings, in which.

DETAILED DESCRIPTION

Figure 1:
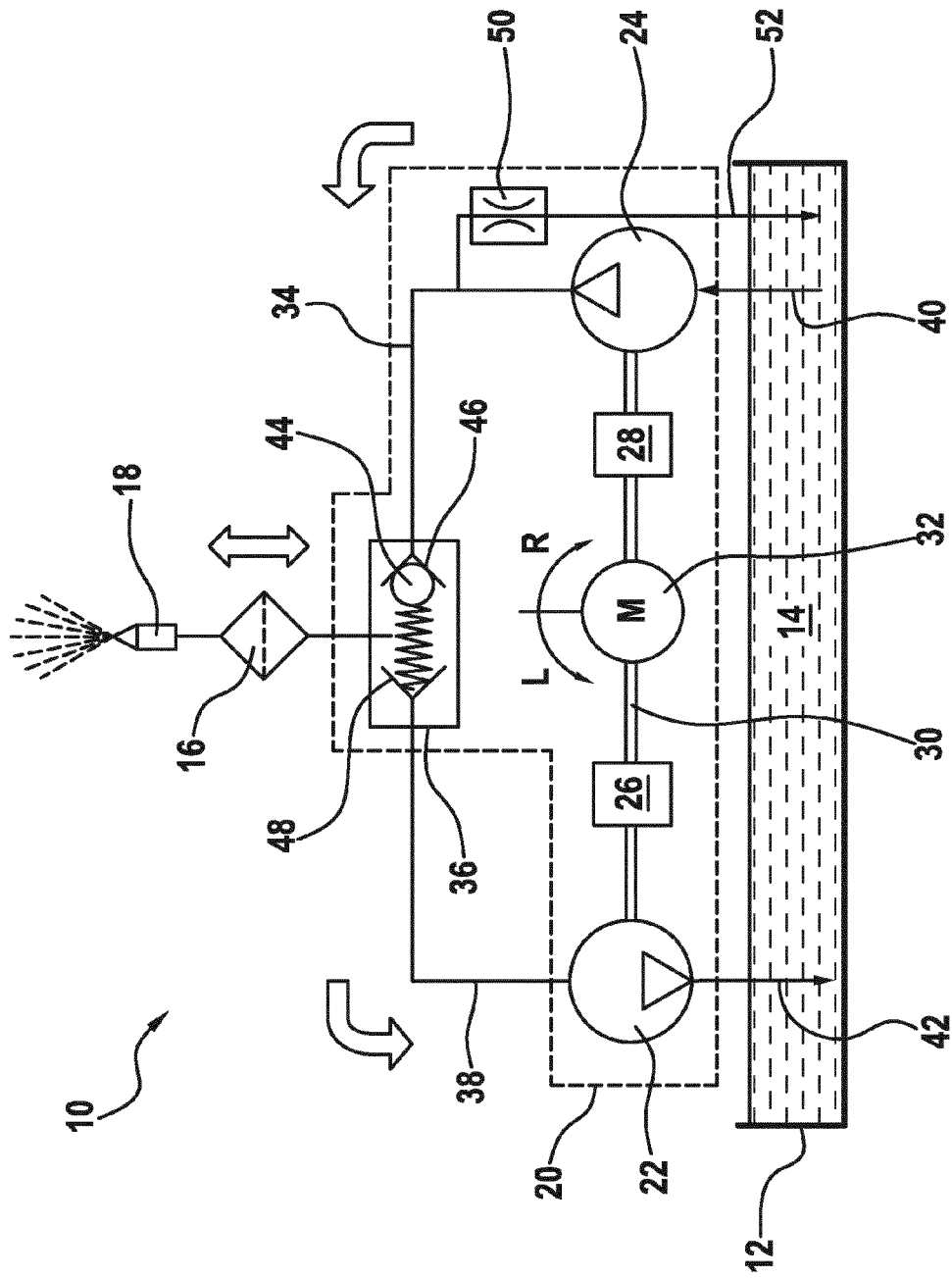
FIG. 1 shows a schematic illustration intended to elucidate the fundamental principle of operation of the pumping device.

FIG. 1 shows a schematic illustration intended to elucidate the fundamental principle of operation of the pumping device for an exhaust gas aftertreatment system operating by what is known as the "SCR" method.

Among the components of the exhaust gas aftertreatment system 10 are a storage tank 12 for the reductant 14, at least one filter unit 16 and a metering module 18.

For greater clarity, the exhaust line of the internal combustion engine, the catalyst required within the exhaust line for catalytic reduction, an open-loop and/or closed-loop control device required to control all the processes within the exhaust gas aftertreatment system 10, and a large number of sensors and actuators which communicate with the open-loop and/or closed-loop control device via a bidirectional bus system are not shown in FIG. 1.

The fundamental directions of flow of the reductant 14 within the exhaust gas aftertreatment system 10 are illustrated by white arrows, which are not provided with reference numerals. Among the components of a pumping device 20 designed in accordance with the invention for supplying the exhaust gas aftertreatment system 10 with the reductant 14 are a first pump 22 (suck-back pump) and a second pump 24 (delivery pump). The pumps 22, 24 are each connected mechanically, via the freewheel couplings 26, 28, to a motor shaft 30 of a (drive) motor 32. In a preferred embodiment, the motor 32 is designed as an electric external rotor motor. The (continuous) motor shaft 30 allows simultaneous driving of both freewheel couplings 26, 28, which are designed to act in opposite directions according to the invention.

This means that only the second pump 24 is driven when the motor 32 rotates clockwise ("R"), for example, while the first freewheel coupling 26 freewheels in this direction of rotation and consequently the first pump 22 is stationary. If the direction of rotation of the motor 32 is reversed, so that it then rotates counterclockwise ("L"), the second freewheel coupling 28 freewheels instead. As a result, the second pump 24 is stationary, and the first pump 22 is then driven via the first freewheel coupling 26, which is in engagement in the direction of rotation ("L"). The two oppositely acting freewheel couplings 26, 28 thus allow alternating operation of the pumps 22, 24, depending on the direction of rotation of the motor 32 and of the motor shaft 30.

A discharge line 34 of the second pump 24 is connected to a shuttle valve 36, which is in the no-load idle position in the illustration in FIG. 1. In a corresponding manner, a suction line 38 of the first pump 22 is likewise connected to the shuttle valve 36. The shuttle valve 36 is connected hydraulically, via lines that are not designated, to the filter unit 16 and to the metering module 18 of the exhaust gas aftertreatment system 10. In the context of this description, the term "lines" is taken to mean both pipes and flexible hoses, including armored hoses. The directions of delivery of the two pumps 22, 24, which are preferably designed as diaphragm pumps, are designed to be opposite one another. Consequently, the second pump 24 always draws in the reductant 14 from the storage tank via a suction line 40, while the first delivery pump 22 always pumps the reductant 14 back into the storage tank 14 via a discharge line 42.

An illustrative sequence of the method during the operation of the pumping device 20 and, in association therewith, further details of the construction of the pumping device 20 will be explained in detail below:

When the internal combustion engine is running or has just been started, the reductant 14 is drawn in from the storage tank 12 by the second pump 24 and passes via the discharge line 34 into the shuttle valve 36 ("delivery state"). Owing to the delivery pressure built up in this way, a closing member 44, illustrated here schematically as a ball, rises from the right-hand valve seat 46 of the shuttle valve 36 counter to the spring force built up by the undesignated spring, and— counter to the spring force thereof—is pressed against the left-hand valve seat 48. As a result, the reductant 14 can flow through the shuttle valve 36 and passes via the filter unit to the metering module 18. During this process, the motor 32, which is rotating clockwise ("R"), drives the second pump 24 via the motor shaft 30 and the second freewheel coupling 28. Control of the speed and direction of rotation of the motor 32 is performed by means of the open-loop or closed-loop control device mentioned at the outset.

An electric motor, designed, in particular, as an "external rotor", is preferably used as a motor 32. Using an electric motor makes it easy to perform open-loop and/or closed-loop control. Since, by virtue of its design, the rotor rotates around the stator in the case of an external rotor, the higher moment of inertia of the motor 32 due to this fact can be used in an advantageous manner, in particular to make the delivery flows of the pumps 22, 24 more uniform. Owing to the high moment of inertia of the motor 32, however, it is advantageous to make the motor 32 run as continuously as possible, both in the "delivery state" and in the "suck-back state" of the reductant 14, in order to avoid relatively long run-up times before a target motor speed is reached. After the suck-back process is fully ended, the motor 32 can be switched off. Owing to the fact that the motor 32 usually runs continuously, a particularly uniform supply of reductant 14 to the metering module 18 is furthermore obtained.

Particularly in the "delivery state", however, there can be an unwanted pressure increase in the region of the discharge line 34, the shuttle valve 36, the downstream filter unit 16 and/or the metering module 18 in this case. In order to prevent this, the pumping device 20 in the embodiment shown is fitted with a return flow restrictor 50 or a return flow orifice. Here, the return flow restrictor 50 is connected to the discharge line 34. Excess reductant 14 which is not required in the metering module 18 can then flow back into the storage tank 14 via the return flow restrictor 50 and a return flow line 52 arranged downstream thereof. It is thereby possible to prevent the unwanted pressure increase. As an alternative, it is possible (cf, especially, FIGS. 3 and 4) to design the return flow restrictor 50 or the return flow orifice as an integral part of the shuttle valve 36, thereby enabling the number of line connections, sealing locations and system components to be reduced. To prepare for a relatively long stoppage time of the internal combustion engine, the reductant 14 is sucked back into the storage tank 12. For this suck-back process, the direction of rotation of the motor 32 is reversed from clockwise ("R") to counterclockwise ("L"), thereby initiating what is known as the "suck-back state". Owing to the reversal in the direction of rotation, the second freewheel coupling 28 is in the freewheeling state, with the result that the second pump 24 is stationary. In contrast, the first pump 22 is set in motion by means of the first freewheel coupling 26, which is in engagement in this direction of rotation. As a result, the reductant 14 is drawn in by the first pump 22 from the metering module 18, via the filter unit 16 and the shuttle valve 36, via the suction line 38, and is pumped back into the storage tank 12 by means of the discharge line 42. This "suck-back state" is maintained until, in the ideal case, all the reductant 14 has been sucked back out of the exhaust gas aftertreatment system 10, thus establishing the required ice pressure resistance. Once the suck-back process is complete, the motor 32 can be switched off, with the result that both pumps 22, 24 stop and the pumping device 20 is in the "idle state".

In the "suck-back state", the closing member 44 of the shuttle valve 36 is pressed firmly against the right-hand valve seat 46 owing to the action of the undesignated compression spring, and, at the same time, the left-hand valve seat 48 is exposed, allowing the reductant 14 to be drawn in by the first pump 22 against only a slight resistance. The shuttle valve 36 thus ensures effective hydraulic separation between the two pumps 22, 24 and the delivery branches connected thereto in both main states of the pumping device 20 in the form of the "delivery state" and the "suck-back state".

The shuttle valve 36 operates automatically since a pressure of up to 5.0 bar built up in the discharge line 34 by the second pump 24 in the "delivery state" is significantly higher in the discharge line 34 than a suction vacuum of about 0.5 bar brought about by the first pump 22 in the region of the suction line 38. Consequently, the shuttle valve 36 responds solely on the basis of the respective pressure conditions in the region of the discharge line 34 and of the suction line 38.

If the internal combustion engine is to be restarted, the "delivery state" is initiated again, starting from the "idle state", in that the motor 32 runs up in the clockwise direction of rotation "R", with the result that the second delivery pump 24 pumps the reductant 14 out of the storage tank 12 as far as the metering module 18. The cyclical change between the "delivery state", the "suck-back state" and the "idle state" can be performed as often as required.

Instead of the two freewheel couplings 26, 28 in the preferred embodiment, it is also possible to use couplings (not shown) that can be switched electromagnetically, for example, or in some other way, these being addressed by the open-loop and/or closed-loop control device in a controlled manner. In such a configuration, it is also possible to make both pumps 22, 24 deliver simultaneously if the metering module 18 is taking off too little reductant 14, such that the excess reductant 14 is pumped back immediately into the storage tank 12 by means of the first pump 22 ("recirculation"). It is thereby possible to avoid a pressure rise while the motor 32 is running. In certain circumstances, this may make the return flow restrictor 50 or the return flow line 52 superfluous. In such an embodiment, the shuttle valve 36 may also be unnecessary if the two pumps 22, 24 are sufficiently pressure-resistant or secure against throughflow on both sides when stationary, such that they themselves act as closed "valves" when stationary. Consequently, it may be necessary to form the pumps 22, 24 with some other type of pump than the diaphragm pump that is used for preference here.

Figure 2:
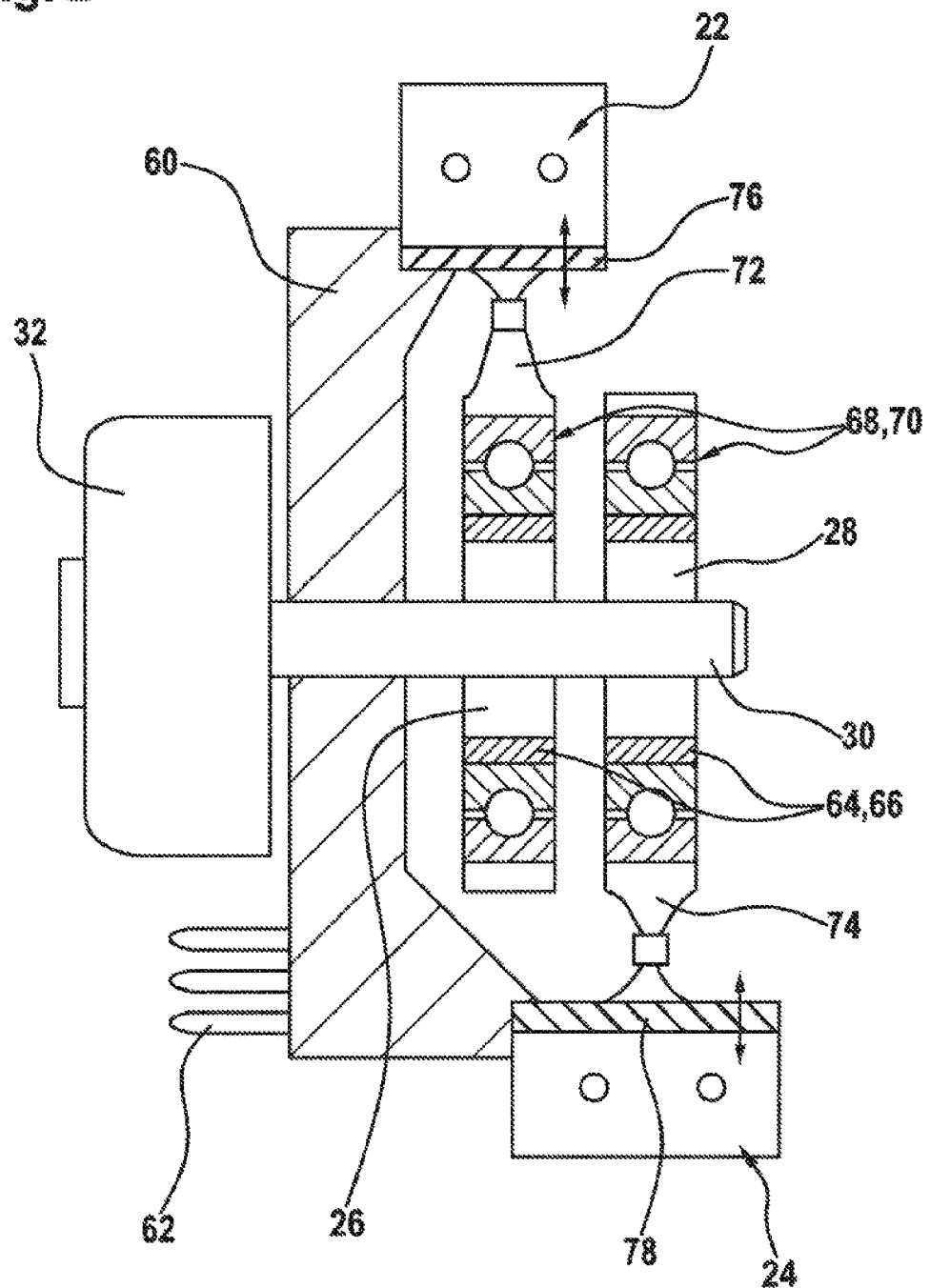
FIG. 2 shows a diagrammatic illustration of the drive motor with two freewheel couplings and the associated two pumps.

FIG. 2 illustrates a sectional view of a possible illustrative embodiment of the motor having two freewheel couplings and associated (diaphragm) pumps.

The motor 32, which is preferably designed as an external rotor, is flanged to a housing 60. The power supply to the motor 32 is via a plug connection 62 or a plug connector. The first and second freewheel couplings 26, 28 are firmly connected to the motor shaft 32 and are driven by the latter. The freewheel couplings 26, 28 are connected to two eccentrics 64, 66, on each of which a ball bearing 68, 70 is mounted. Two connecting rods 72, 74, to each of which a pump diaphragm 76, 78 is pivotally attached, are rotatably mounted on the ball bearings 68, 70.

By means of the two eccentrics 64, 66 and the connecting rods 72, 74, the rotary motion of the motor shaft 30 is transformed into a linear motion, which is transmitted to the diaphragms 76, 78 of the pumps 22, 24 by the connecting rods 72, 74. As a result, the diaphragms 76, 78 perform a periodic upward and downward motion, parallel to the two undesignated white arrows, and pump the reductant through the pumping device 20—as explained in greater detail as part of the description of FIG. 1. Owing to the opposite action of the two freewheel couplings 26, 28, only that pump of the two pumps 22, 24 is in delivery mode, of which the freewheel coupling 26, 28 is in engagement—depending on the direction of rotation of the motor 32. Any check valves that are still required for the delivery mode of the pumps 22, 24 are not shown in FIG. 2.

Figure 3:
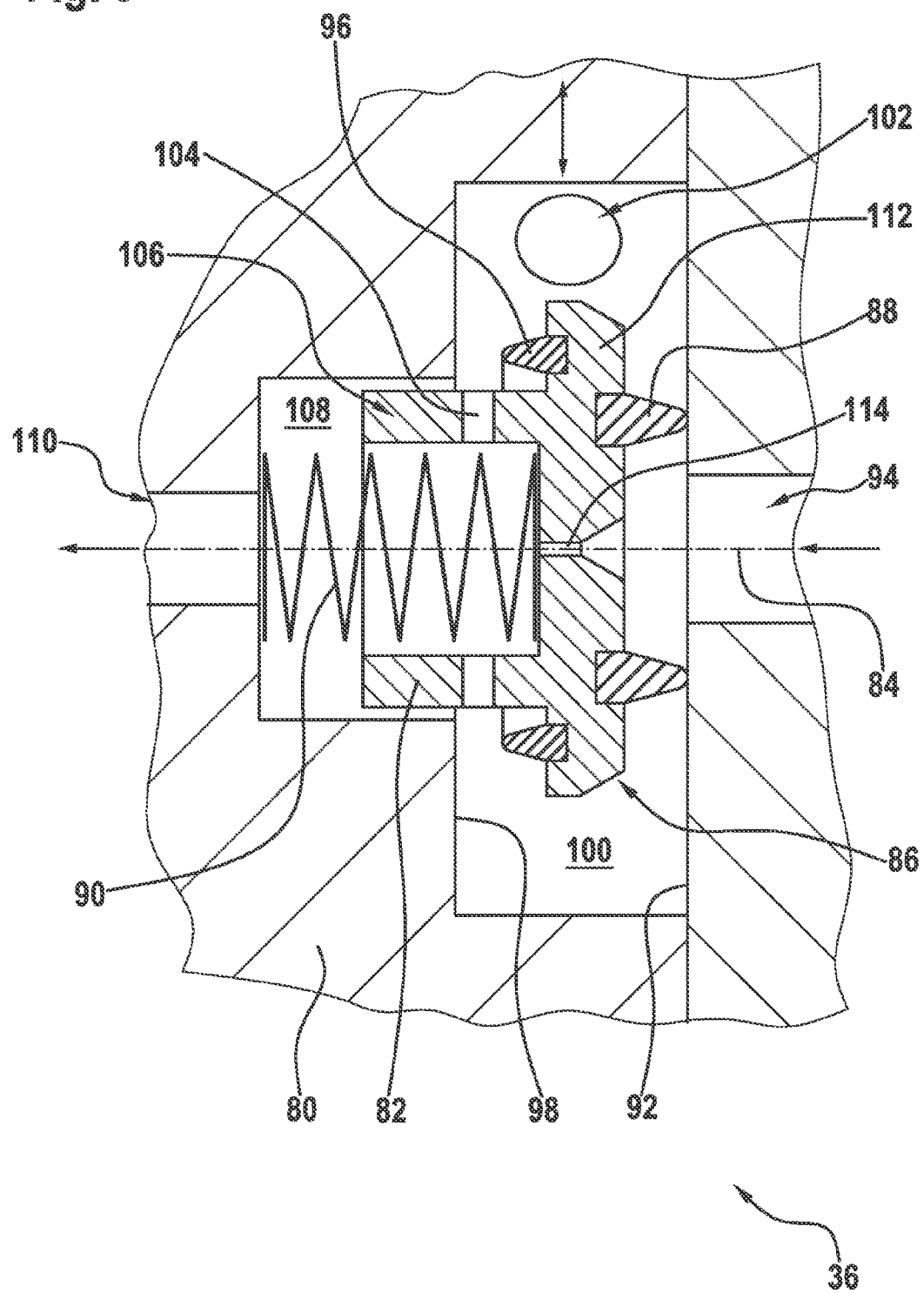
FIG. 3 shows a cross section through the shuttle valve.

FIG. 3 illustrates a more detailed cross section through one embodiment of the shuttle valve 36 in a no-load "idle position".

The fundamental flow conditions of the reductant through the shuttle valve 36 are once again illustrated by the three undesignated white arrows. Among the components of the shuttle valve 36 is a housing 80, in which an approximately cup-shaped closing member 82 is accommodated in a sprung manner in such a way that it can be moved parallel to a vertical longitudinal axis 84. The closing member 82 has an encircling projection 86 with a first seal 88 (sealing lip), which is pressed against a right-hand housing wall 92 as a sealing surface owing to the action of a compression spring 90. A right-hand pressure port 94 of the shuttle valve 36 is thereby sealed off, said port normally being connected to the discharge line 34 of the second pump 24 (cf FIG. 1).

If the pressure of the reductant in the region of the pressure port 94 rises due to a pumping action of the second pump 24 to such an extent that the spring force of the compression spring 90 is overcome, the closing member 82 moves to the left, parallel to the valve longitudinal axis 84, until a second seal 96 (sealing lip) rests against a left-hand housing wall 98 as a sealing surface. The first seal 88 is situated on an undesignated front side of the projection 86 or of the closing member 82, while the second seal 96 is situated on an undesignated rear side of the projection 86.

In this "open position" of the closing member 82, the reductant can flow from the pressure port 94, through a large, approximately cylindrical chamber 100 within the housing 80, as far as a bidirectional port 102, which is generally connected to the filter unit 16 or the downstream metering module 18. In order to ensure proper functioning of the shuttle valve 36, the compression spring 90 should have a spring force sufficient to ensure that the movement of the closing member 82 to the left takes place at the earliest from a pressure of 1.5 bar in the region of the pressure port 94.

If the pump 24 ceases delivery, then, after a sufficient pressure drop, the closing member 82 is once again pushed to the right by the spring force of the compression spring 90 until seal 88 is resting against the right-hand housing wall 92 as a sealing seat, and the "idle position" shown in FIG. 3 has been reached again.

In the "suck-back state", the closing member 82 is in the "idle position" shown in FIG. 3, allowing the reductant to flow into the large chamber 100 from above through the (bidirectional) port 102. From there, the reductant flows via a multiplicity of suck-back bores—of which just one suck-back bore 104 is designated—into a hollow-cylindrical stem 106 of the closing member 82. From there, the reductant flows into a smaller, cylindrical chamber 108 of the housing 80, which opens into a suction port 110. The suction port 110 is generally connected to the first pump 22, which is used to pump the reductant back into the storage tank (cf FIG. 1).

In the embodiment shown in FIG. 3, the shuttle valve 36 furthermore also performs the function of a return flow restrictor or a return flow line (cf FIG. 1) in the pumping device, which can be eliminated as a result.

For this purpose, an orifice opening 114 with a small cross-sectional area is introduced into a base 112 of the closing member 82, forming a return flow restrictor or return flow orifice in terms of hydraulics. By means of the orifice opening 114, which is formed by a conically countersunk but otherwise cylindrical bore, excess reducing fluid which is not discharged in the metering module owing, for example, to special operating states of the internal combustion engine, can return from the pressure port 94, via the suction port 110, to the storage tank 12 through the first pump. As a result, an excessive pressure rise in the system is avoided. The two seals 88, 96 are produced from an elastomer which is sufficiently resistant to chemicals, especially to the reductant ("AdBlue®"), such as an EPDM (ethylene-propylene-diene monomer). In principle, the closing member 82 or the projection 86 can be produced from a metal alloy or from a plastic material as long as the required resistance to the reductant is ensured. In a preferred embodiment, however, the closing member 82 is produced from a thermoplastic or a thermosetting plastic ("TP"/"TS"), the thermosetting plastic being preferred in the case of the integrated throttling function in FIG. 3 since this is more resistant to "flow abrasion", which occurs to a greater extent as compared with that in the orifice opening 114. The seals 88, 96 can be formed integrally with the closing member 82 by what is known as the "2-C" injection molding method ("two-component" injection molding method), for example, or by way of what is known as the "compression molding method".

Figure 4:
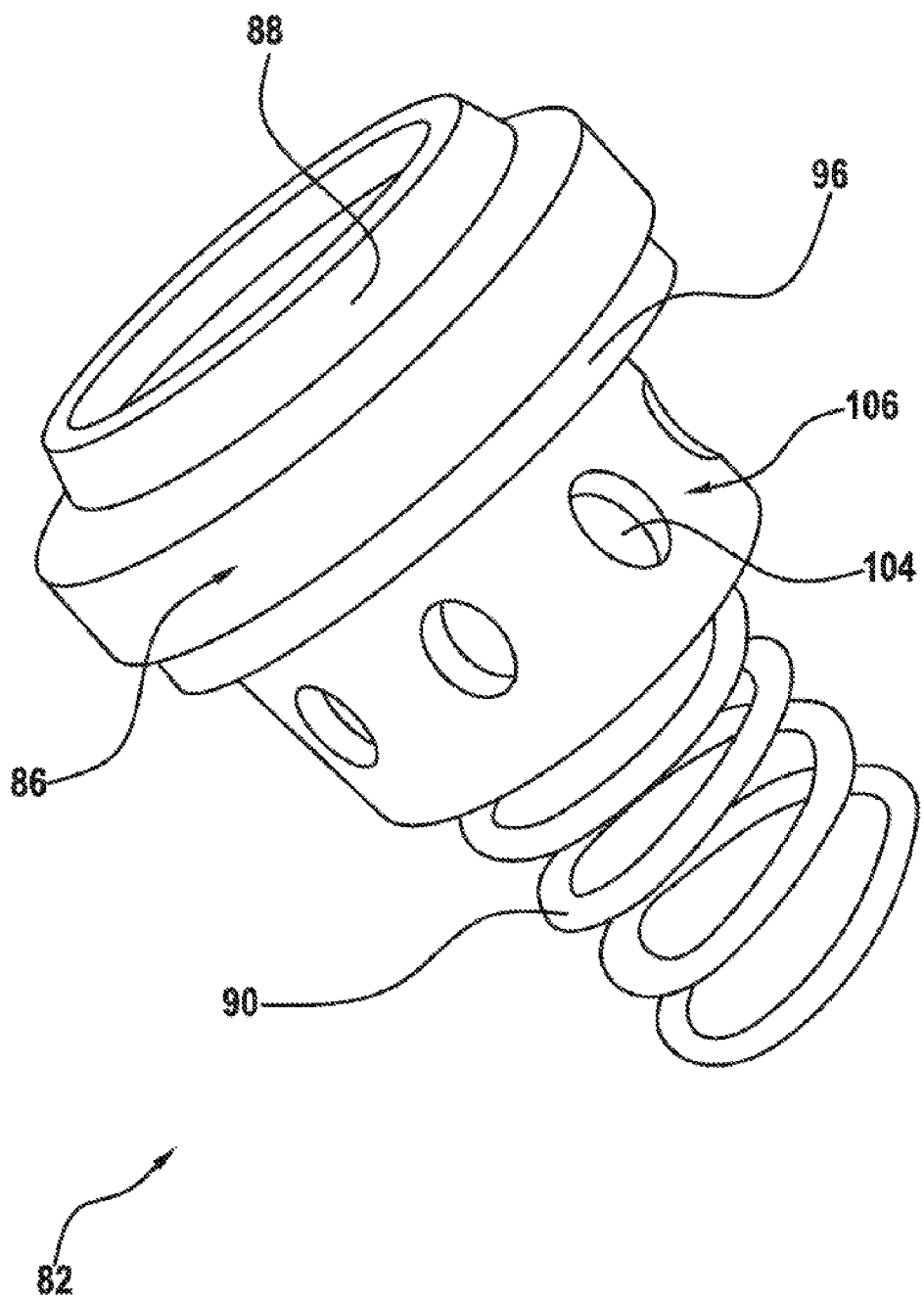
FIG. 4 shows a perspective view of the closing member of the shuttle valve.

FIG. 4 shows an enlarged perspective view of the closing member 82 from FIG. 3.

A multiplicity of suck-back bores are introduced at uniform spacings around the circumference in the sleeve-type stem 106 of the closing member 82, one of said suck-back bores bearing the reference numeral 104. The compression spring 90 is inserted into the stem 106 and is guided radially by the latter. The first and second seals 88, 96 are arranged above and below the encircling projection 86. In the event that the closing member 82 is formed by a plastic material, the two seals 88, 96 can be produced integrally (in one piece) with the body of the closing member 82 by the two-component injection molding method (known as the "2-C" injection molding method), for example, or by what is known as the "compression molding method".

The pumping device according to the invention for an exhaust gas aftertreatment system in a motor vehicle, having two pumps and a drive motor, which are each alternately driven by the drive motor via oppositely acting freewheel couplings in the preferred embodiment, allows a reliable and uniform supply of the reductant required for catalytic exhaust gas purification to a metering module of the exhaust gas aftertreatment system.

Moreover, the pumping device allows reliable and yet low-maintenance operation of the exhaust gas aftertreatment system in comparison with previously known solutions having a 4/2-way valve, and the optimized suck-back process furthermore ensures the required ice pressure resistance at low motor vehicle operating temperatures.

What is claimed is:

1. An exhaust gas aftertreatment system (10) of an internal combustion engine comprising a pumping device (20) for supplying exhaust gas of the internal combustion engine with a reductant (14) in order to reduce nitrogen oxides in the exhaust gas flow of the internal combustion engine, the pumping device (20) having a motor (32) for driving two pumps (22, 24), characterized in that the first pump (22) is connected to the motor by a first freewheel coupling (26), and the second pump (24) is connected to the motor by a second freewheel coupling (28), wherein the motor (32) is operable to rotate in a first direction and a second direction, and wherein the first pump (22) is driven by the motor (32) via the first coupling (26) when the motor (32) is rotating in the first direction and is not driven by the motor (32) via the first coupling (26) when the motor (32) is rotating in the second direction, and the second pump (24) is driven by the motor (32) via the second coupling (28) when the motor (32) is rotating in the second direction and is not driven by the motor (32) via the second coupling (28) when the motor (32) is rotating in the first direction.

2. The pumping device (20) as claimed in claim 1, wherein a metering module (18) of the exhaust gas aftertreatment system (10) is connected to a discharge line (34) of the second pump (24) and to a suction line (38) of the first pump (22) by a shuttle valve (36).

3. The pumping device (20) as claimed in claim 1, wherein a suction line (40) of the second pump (24) and a discharge line (42) of the first pump (22) are connected to a storage tank (12) for the reductant (14).

4. The pumping device (20) as claimed in claim 1, wherein the pumps (22, 24) are diaphragm pumps.

5. The pumping device (20) as claimed in claim 1, wherein the motor (32) is an electric motor.

6. The pumping device (20) as claimed in claim 2, wherein at least one return flow restrictor (50 is provided.

7. The pumping device (20) as claimed in claim 6, wherein the return flow restrictor (50) is arranged between the second pump (24) and the shuttle valve (36) and is connected to the storage tank (12) by a return flow line (52).

8. The pumping device (20) as claimed in claim 6, wherein the return flow restrictor is integrated into the shuttle valve (36) and is connected to a storage tank (12) for the reductant.

9. A method for operating a pumping device (20) as claimed in claim 1, for supplying an exhaust gas aftertreatment system (10) of an internal combustion engine with a reductant (14) in order to reduce nitrogen oxides in the exhaust gas flow of the internal combustion engine, having a motor (32) for driving two pumps (22, 24), characterized in that a switch is made between a delivery state and a suck-back state by reversing the direction of rotation of the motor (32) between a first direction and a second direction, wherein, in the delivery state, the reductant (14) is pumped out of a storage tank (12) for the reductant (14), via a shuttle valve (36), as far as a metering module (18) by means of the second pump (24) and, in the suck-back state, the reductant (14) is sucked back out of the metering module (18), via the shuttle valve (36), into the storage tank (12) by means of the first pump (22), wherein the first pump (22) is driven by the motor (32) when the motor (32) is rotating in the first direction and is not driven by the motor (32) when the motor (32) is rotating in the second direction, and the second pump (24) is driven by the motor (32) when the motor (32) is rotating in the second direction and is not driven by the motor (32) when the motor (32) is rotating in the first direction.

10. The pumping device (20) as claimed in claim 1, wherein the motor (32) is an external rotor motor.

11. The pumping device (20) as claimed in claim 2, wherein a suction line (40) of the second pump (24) and a discharge line (42) of the first pump (22) are connected to a storage tank (12) for the reductant (14).

12. The pumping device (20) as claimed in claim 11, wherein at least one return flow restrictor (50) is provided.

13. The pumping device (20) as claimed in claim 12, wherein the return flow restrictor (50) is arranged between the second pump (24) and the shuttle valve (36) and is connected to the storage tank (12) by a return flow line (52).

14. The pumping device (20) as claimed in claim 13, wherein the return flow restrictor is integrated into the shuttle valve (36) and is connected to the storage tank (12).

15. The pumping device (20) as claimed in claim 1, wherein the first pump (22) is connected to a reductant storage tank (12) via a discharge line (42) and a shuttle valve (36) via a suction line (38) and the second pump (24) is connected to the reductant storage tank (12) via a suction line (40) and the shuttle valve (36) via a discharge line (34), wherein the second pump (24) supplies reductant (14) to the shuttle valve (36) from the storage tank (12) when driven by the motor (32) and the first pump (22) supplies reductant (14) to the storage tank (12) from the shuttle valve (36) when driven by the motor (32).

16. The pumping device (20) as claimed in claim 15, wherein a metering module (18) of the exhaust gas aftertreatment system (10) is connected to the discharge line (34) of the second pump (24) and to the suction line (38) of the first pump (22) via the shuttle valve (36) and is configured to receive a particularly uniform supply of reductant (14) from the shuttle valve (36) and is further configured to deliver the supply of reductant (14) to the exhaust gas flow of the internal combustion engine.

17. The pumping device (10) as claimed in claim 16, wherein the metering module (18) delivers the supply of reductant (14) to the exhaust gas flow of the internal combustion engine when the second pump (24) is supplying reductant (14) to the shuttle valve (36) and does not deliver the supply of reductant (14) to the exhaust gas flow of the internal combustion engine when the second pump (24) is not supplying reductant (14) to the shuttle valve (36).

18. The pumping device (10) as claimed in claim 15, wherein at least one return flow restrictor (50) is provided, and wherein the return flow restrictor (50) is arranged between the second pump (24) and the shuttle valve (36) and is connected to the storage tank (12) by a return flow line (52).

* * * * *